US012690102B2

(12) United States Patent
De Cicco et al.

(10) Patent No.: US 12,690,102 B2
(45) Date of Patent: Jul. 21, 2026

(54) CIRCUITS FOR DISTRIBUTING BITMAPS FOR A PLURALITY OF PIXELATED LIGHT SOURCES

(71) Applicant: Infineon Technologies AG, Neubiberg (DE)

(72) Inventors: Adolfo De Cicco, Castel d'Azzano (IT); Gernot Unterweger, Latschach (AT); Andrea Scenini, Montegrotto Terme (IT); Pietro Vallese, Padua (IT); Salvatore Sanna, Padua (IT)

(73) Assignee: Infineon Technologies AG, Neubiberg (DE)

( * ) Notice: Subject to any disclaimer, the term of this patent is extended or adjusted under 35 U.S.C. 154(b) by 118 days.

(21) Appl. No.: 18/900,190

(22) Filed: Sep. 27, 2024

(65) Prior Publication Data

US 2026/0095985 A1     Apr. 2, 2026

(51) Int. Cl.
| | |
|---|---|
| *H05B 45/30* | (2020.01) |
| *B60Q 1/08* | (2006.01) |
| *H05B 47/105* | (2020.01) |

(52) U.S. Cl.
CPC .............. *H05B 45/30* (2020.01); *B60Q 1/08* (2013.01); *H05B 47/105* (2020.01)

(58) Field of Classification Search
None
See application file for complete search history.

(56) References Cited

U.S. PATENT DOCUMENTS

| | | | |
|---|---|---|---|
| 9,944,218 B1 | 4/2018 | Park et al. | |
| 11,318,878 B2 | 5/2022 | Unterweger et al. | |
| 11,358,518 B2 * | 6/2022 | Unterweger | H05B 45/14 |
| 11,889,605 B1 * | 1/2024 | Zhu | H05B 47/155 |
| 2017/0357582 A1 * | 12/2017 | Decloedt | H05B 45/58 |
| 2019/0132929 A1 | 5/2019 | Sturm et al. | |
| 2020/0171900 A1 | 6/2020 | Pampattiwar et al. | |
| 2022/0330400 A1 | 10/2022 | Unterweger et al. | |
| 2024/0373521 A1 * | 11/2024 | Unterweger | H05B 45/30 |

FOREIGN PATENT DOCUMENTS

| | | |
|---|---|---|
| KR | 1708342 | 2/2017 |

* cited by examiner

*Primary Examiner* — Jany Richardson
(74) *Attorney, Agent, or Firm* — Shumaker & Sieffert, P.A.

(57)         ABSTRACT

A lighting circuit may comprise a receiver circuit configured to receive information from a processor, wherein the information comprises a first bitmap associated with a first set of lighting elements and a second bitmap associated with a second set of lighting elements, and a driver circuit connected to the receiver circuit via a first communication interface, wherein the driver circuit is configured to receive the information from the receiver circuit via the first communication interface. The driver circuit may be configured to extract the first bitmap and the second bitmap from the information, store the first bitmap for driving the first set of lighting elements, and output the second bitmap via a second communication interface to another circuit for driving the second set of lighting elements.

24 Claims, 7 Drawing Sheets

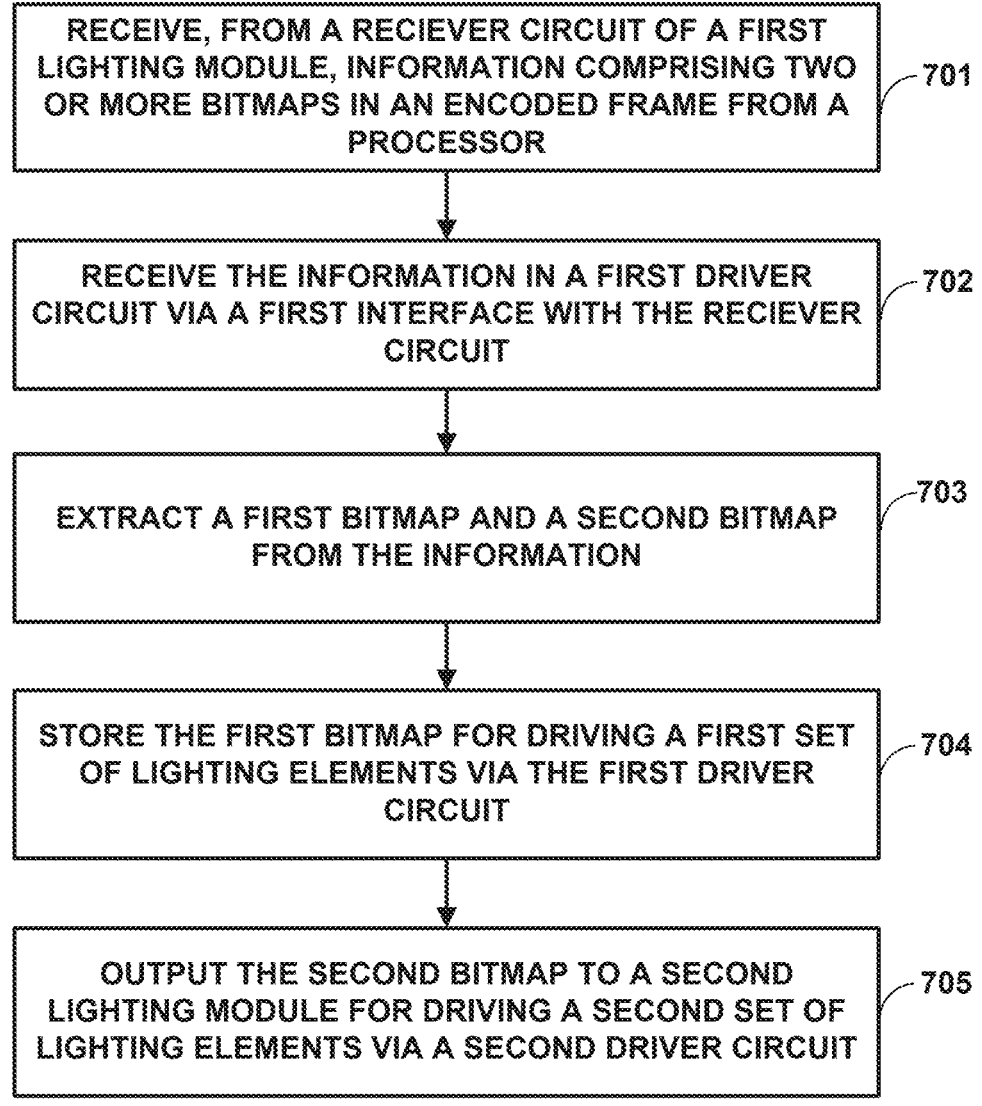

RECEIVE, FROM A RECIEVER CIRCUIT OF A FIRST LIGHTING MODULE, INFORMATION COMPRISING TWO OR MORE BITMAPS IN AN ENCODED FRAME FROM A PROCESSOR ⟋701

RECEIVE THE INFORMATION IN A FIRST DRIVER CIRCUIT VIA A FIRST INTERFACE WITH THE RECIEVER CIRCUIT ⟋702

EXTRACT A FIRST BITMAP AND A SECOND BITMAP FROM THE INFORMATION ⟋703

STORE THE FIRST BITMAP FOR DRIVING A FIRST SET OF LIGHTING ELEMENTS VIA THE FIRST DRIVER CIRCUIT ⟋704

OUTPUT THE SECOND BITMAP TO A SECOND LIGHTING MODULE FOR DRIVING A SECOND SET OF LIGHTING ELEMENTS VIA A SECOND DRIVER CIRCUIT ⟋705

FIG. 7

CIRCUITS FOR DISTRIBUTING BITMAPS FOR A PLURALITY OF PIXELATED LIGHT SOURCES

TECHNICAL FIELD

This disclosure relates to circuits for driving and controlling pixelated light sources, such as matrices of light emitting diodes (LEDs) or other light sources that comprises a plurality of lighting elements that are individually controllable.

BACKGROUND

Driver circuits are often used to control a voltage, current, or power at a load. For instance, a light emitting diode (LED) driver may control the power supplied to one or many light emitting diodes. LED drivers may comprise voltage regulators, linear regulators, or DC to DC power converters, such as buck-boost, buck, boost, or another DC to DC converter. DC to DC power converters may be especially useful for LED drivers to regulate current through LED strings.

Some LED circuits include a large number of individually controllable LEDs arranged in a two-dimensional matrix. The individually controllable LEDs can be driven so as to provide different lighting (e.g., high beam or low beam lighting) for different conditions, or to provide advanced lighting effects. Advanced vehicle headlamp systems, for example, are one example application of such LED circuits, whereby lighting effects associated with vehicle operation can be used to improve the driving experience and to promote vehicle safety.

SUMMARY

In general, this disclosure is directed to circuits and communication techniques for handling the communication of information (e.g., pixel intensity values) to more than one pixelated light source. Some advanced lighting systems may include two or more pixelated light sources, such as two or more different matrices of light emitting diodes (LEDs). Controlling the two or more pixelated light sources in a synchronized or complementary fashion can present communication challenges. To solve such challenges in a cost-effective manner, the techniques and circuits of this disclosure may implement a type of bridge function within a driver circuit of a lighting module. Different communication interfaces can be used to deliver information to the driver circuit and to deliver the information from the driver circuit to another driver circuit in a different lighting module.

In some examples, a lighting circuit may comprise a receiver circuit configured to receive information from a processor, wherein the information comprises a first bitmap associated with a first set of lighting elements and a second bitmap associated with a second set of lighting elements, and a driver circuit connected to the receiver circuit via a first communication interface, wherein the driver circuit is configured to receive the information from the receiver circuit via the first communication interface. The driver circuit may be configured to extract the first bitmap and the second bitmap from the information, store the first bitmap for driving the first set of lighting elements, and output the second bitmap via a second communication interface to another circuit for driving the second set of lighting elements.

In some examples, a lighting system may comprise a first lighting module and a second lighting module. The first lighting module may comprise a receiver circuit configured to receive information from a processor, wherein the information comprises a first bitmap associated with a first set of lighting elements and a second bitmap associated with a second set of lighting elements, and a first driver circuit connected to the receiver circuit via a first communication interface, wherein the driver circuit is configured to receive the information from the receiver circuit via the first communication interface. The second lighting module may comprise a second driver circuit and a second set of lighting elements. The first driver circuit may be configured to extract the first bitmap and the second bitmap from the information, store the first bitmap for driving the first set of lighting elements, and output the second bitmap via a second communication interface to the second lighting module.

In some examples, a method comprises receiving by a receiver of a first lighting module, information from a processor, wherein the information comprises a first bitmap associated with a first set of lighting elements within the first lighting module and a second bitmap associated with a second set of lighting elements within a second lighting module, receiving by a driver circuit of the first lighting module, the information from the receiver circuit via a first communication interface, extracting the first bitmap and the second bitmap from the information, storing the first bitmap within the first lighting module for driving the first set of lighting elements, and outputting the second bitmap from the first lighting module to the second lighting module via a second communication interface for driving the second set of lighting elements.

Details of these and other examples are set forth in the accompanying drawings and the description below. Other features, objects, and advantages will be apparent from the description and drawings, and from the claims.

BRIEF DESCRIPTION OF DRAWINGS

FIG. 7 is a flow diagram consistent with techniques according to this disclosure.

DETAILED DESCRIPTION

This disclosure is directed to circuits and circuit communication techniques for handling the communication of information (e.g., pixel intensity values) to more than one pixelated light source. Pixelated light sources may comprise a large number of individually controllable light sources, such as individually controllable light emitting diodes (LEDs) or individually controllable micromirrors. The individual pixel control of the pixels within a large matrix of pixels can allow for a wide variety of lighting effects and desirable lighting features. Advanced vehicle headlamps are an application of pixelated light sources, however, pixelated light sources can be used in any of a wide variety of other lighting applications.

Some advanced lighting systems may include two or more pixelated light sources, such as two or more different matrices of LEDs. Controlling the two or more pixelated light sources in a synchronized or complementary fashion can present communication challenges. To solve such challenges in a cost-effective manner, the techniques and circuits of this disclosure may implement a type of bridge function within a driver circuit of a lighting module. Different communication interfaces can be used to deliver information to the driver circuit and to deliver the information from the driver circuit to another driver circuit in a different lighting module. The bridge function allows for translation of the pixel information into different formats for communication over different types of interfaces within the circuit, which can be very useful and cost-effective for different applications and settings.

Figure 1:
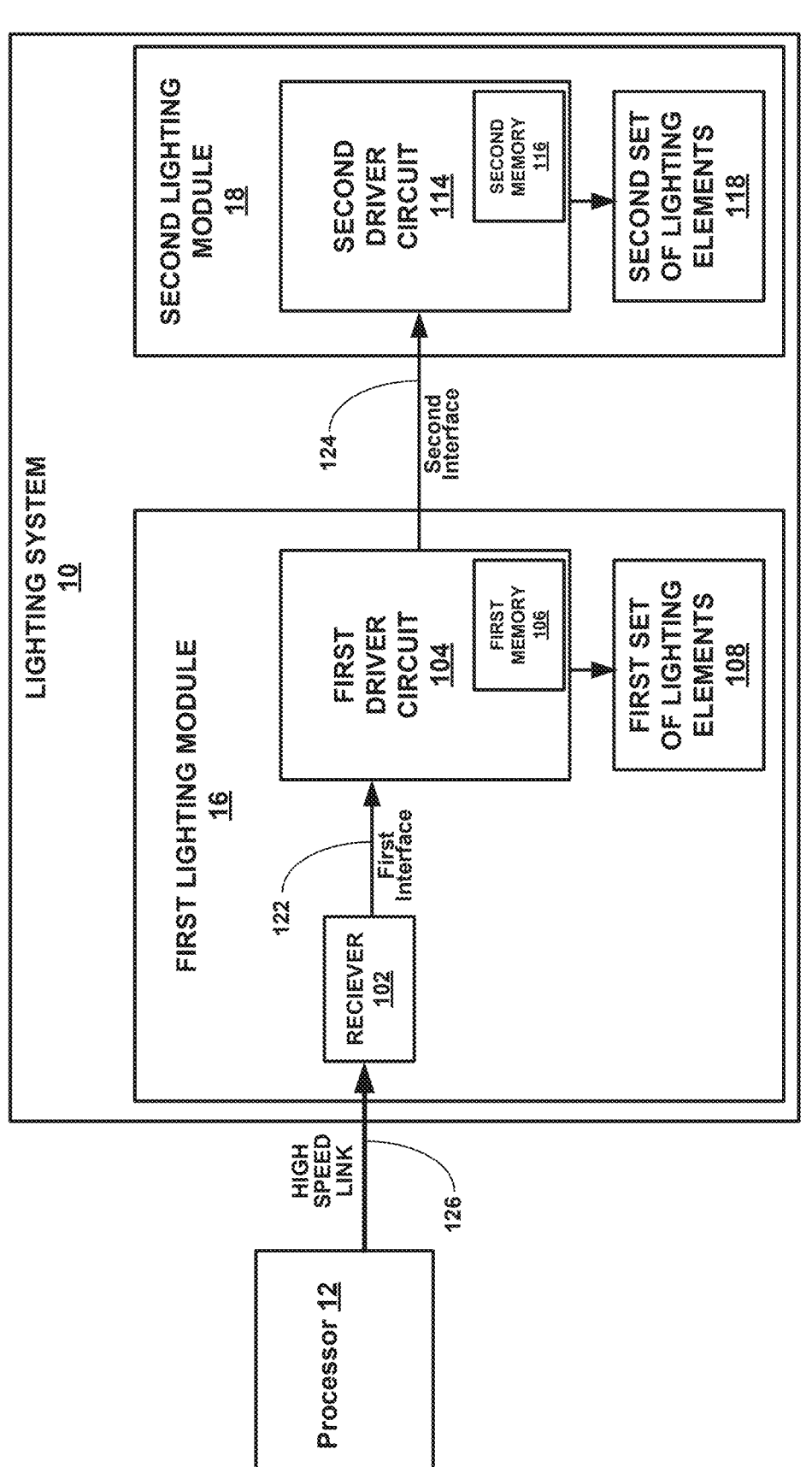
FIG. 1 is a block diagram illustrating system that includes a lighting system and a processor consistent with this disclosure.

FIG. 1 is a block diagram illustrating system that includes a lighting system 10 and a processor 12 consistent with this disclosure. Lighting system 10 may comprise two different pixelated light sources, which may comprise so-called matrix light sources. In this example the two different pixelated light sources are first set of lighting elements 108 and second set of lighting elements 118. Each of the first set of lighting elements 108 and the second set of lighting elements 108 may comprise a so-called matrix light source that includes large number (e.g., greater than 2000) individually controllable lighting elements. In some examples, the controllable lighting elements may comprise LEDs, e.g., so-called micro-LEDs arranged in a two-dimensional matrix. Micro-LEDs, for example, may generally refer to LEDs with lateral dimensions smaller than 100 micrometers, in some case smaller than 50 micrometers. The techniques of this disclosure are not limited to micro-LED control, however, can also apply to other types of matrix light sources, such as those using micro-mirrors or other lighting elements instead of micro-LEDs. Also, the communication techniques described herein could also apply to the control of two different types of matrix light sources.

The techniques and circuit described herein can help to efficiently and cost-effectively control first set of lighting elements 108 and the second set of lighting elements 108 in a coordinated manner. A processor 12 may be configured to communicate lighting information to lighting system 10 via a high-speed link 126. In some examples, high-speed link 126 may comprise an input interface effective for communicating video data, such as a gigabit multimedia serial link (GMSL). GMSL is a serial link technology that is especially useful for video distribution in vehicles. In other examples, another type of input interface may be used, such as Ethernet, flat panel display (FPD) link, openLDI, MIPI camera serial interface CSI-2.

GMSL is desirable as an input interface when the information for driving the first set of lighting elements 108 and the second set of lighting elements 108 is encoded as bitmaps in data structures that are the same or similar to video frames used for communicating video data. In this case, the information for driving the first set of lighting elements 108 and the second set of lighting elements 108 may comprise bitmaps of intensity values that indicate the desired intensity of each of the LEDs in the first set of lighting elements 108 and the second set of lighting elements 108. A video frame can be created to include the information for driving the first set of lighting elements 108 and the second set of lighting elements 108, and this disclosure describes useful ways of unpackaging and communicating the information within a circuit system. In some examples, the circuits and techniques described herein can simplify frame updates, synchronization, and error handling, when controlling two or more pixelated light sources in a coordinated manner.

A first lighting module 16 is one example of a lighting circuit consistent with this disclosure. First lighting module 16 includes a receiver circuit 102 configured to receive information from processor 12, wherein the information comprises a first bitmap associated with first set of lighting elements 108 and a second bitmap associated with a second set of lighting elements 118. A first driver circuit 104 is connected to receiver circuit 102 via a first communication interface 122. First driver circuit 104 is configured to receive the information (e.g., a video frame that includes the first and second bitmaps) from receiver circuit 102 via the first communication interface 122. First driver circuit 104 may include a first memory 106, e.g., for storing or buffering information consistent with this disclosure.

First driver circuit 104 may be configured to extract the first bitmap and the second bitmap from the information received from receiver circuit 102 and store the first bitmap in first memory 106 for driving the first set of lighting elements 108. In addition, first driver circuit 104 may also be configured to output the second bitmap via a second communication interface 124 to another circuit (i.e., to second driver circuit 114 of second lighting module 18) for driving the second set of lighting elements 118. Second driver circuit 114 may include second memory 116 for storing and using the second bitmap. By using first driver circuit 104 as a bridge function to extract and communicate the second bitmap, first communication interface 122 and second communication interface 124 can be selected for a desirable and cost-effective design. In some cases, first communication interface 122 may comprise a parallel video interface that includes multiple wire connections and second communication interface 124 may comprise a serial interface that includes a single connection. This is desirable and effective especially when the number of lighting elements in second set of lighting elements 118 is substantially less than the number of lighting elements in first set of lighting elements. In other examples, however, other types of translation to different interfaces could be used, such as parallel-to-parallel (i.e., parallel interface to a different type of parallel interface), serial to parallel, or serial-to-serial (i.e., serial interface to a different type of serial interface). A driver circuit of this disclosure (e.g., first driver circuit 104) may be configured to receive information comprising a first bitmap and a second bitmap via a first interface, store the first bitmap, buffer the second bitmap, and output the second bitmap via a second interface.

In some examples, first communication interface 122 comprises a parallel interface that includes a plurality of connectors arranged in parallel and second communication interface 124 comprises a serial interface that includes a single connector. In this example, first driver circuit 104 may be configured to receive the information, unpackage and store the first bitmap, and repackage and send the second bitmap to another driver circuit in another lighting module. A parallel-to-serial change of the second bitmap may be a useful design especially in the case where the first bit map is much larger than the second bitmap, which may be a typical design for an automotive headlamp. In other examples, translation may occur from serial-to-parallel, serial-to-serial (e.g., with translation from one type of serial connection to a different type of serial connection), or parallel-to-parallel (e.g., with translation from one type of parallel connection to a different type of parallel connection). These other types of translation by a driver circuit may be useful for headlamps or other lighting scenarios.

In one vehicle headlamp example, the first bitmap may include greater than 20,000 intensity values (e.g., approximately 100,000 values) and the first set of lighting elements comprise greater than 20,000 light emitting diodes (e.g., approximately 100,000 LEDs). Moreover, the second bitmap may include fewer than 20,000 intensity values (e.g., approximately 16,000 values) and the second set of lighting elements comprise fewer than 20,000 light emitting diodes (e.g., approximately 16,000 LEDs). The first driver circuit 104 may be is configured to drive the first set of lighting elements within a vehicle headlamp module, wherein the information comprises a frame of headlamp information, wherein the frame of headlamp information includes the first bitmap and the second bitmap. Different types of frame encoding are discussed below, and video formats may be useful for encoding information (e.g., intensity values) for lighting elements.

In some examples, first driver circuit 104 can be configured to synchronize updates of the first bitmap and the second bitmap based on a subsequent frame of the headlamp information. In other words, the use of a common frame for both sets of bitmaps, along with the unpackaging and repackaging can allow for an easy mechanism to ensure synchronization of headlamp information in the control of both first set of lighting elements 108 and second set of lighting elements 118.

In some examples, first driver circuit 104 can be configured to output the second bitmap after extracting the first bitmap and the second bitmap and in response to a valid cyclical redundancy check (CRC), which can help to ensure data integrity and avoid unnecessary sending of invalid information over the second communication interface 124.

In some examples, first driver circuit 104 may be configured to begin output the second bitmap while extracting the first and second bitmaps, which can improve the speed of sending information from first driver circuit 104 to second driver circuit 114 over second communication interface 124.

In some examples, first driver circuit 104 may be configured to drive first set of lighting elements 108 based on the first bitmap in response to determining an end of prior pulse modulation (PM) cycles of the first set of lighting elements 108. In other words, first driver circuit 104 may use the previous PM cycle associated with first set of lighting elements 108 to define when to drive lighting elements 108 based on the first bitmap with new PM signals in a new PM cycle. In various examples, by using the various techniques described above and here, first driver circuit 104 can be configured to drive the first set of lighting elements 108 based on the first bitmap at a time when another circuit (i.e., second driver circuit 114) drives the second set of lighting elements 118 based on the second bitmap. The techniques of this disclosure can greatly simplify synchronized lighting among multiple different sets of lighting elements (e.g., multiple different LED matrix light sources operating in a commonly controlled manner).

In order to store the proper information for driving the first set of lighting elements 108 and translating and sending the proper information for driving the second set of lighting elements 118, in some examples, first driver circuit 104 may be configured to receive a frame comprising the first bitmap and the second bitmap via first communication interface 122, store the first bitmap (e.g., in first memory 106), buffer the second bitmap (e.g., in a buffer within first memory 106), and output the second bitmap via second communication interface 124. In some examples, first driver circuit 104 may be further configured to extract rows from the frame associated with the second bitmap, and output the rows associated with the second bitmap via the second interface. Row-by-row communication over second communication interface 124 that comprises a serial interface may be sufficient and desirable to help reduce circuit costs relative to using another parallel interface.

Figure 2:
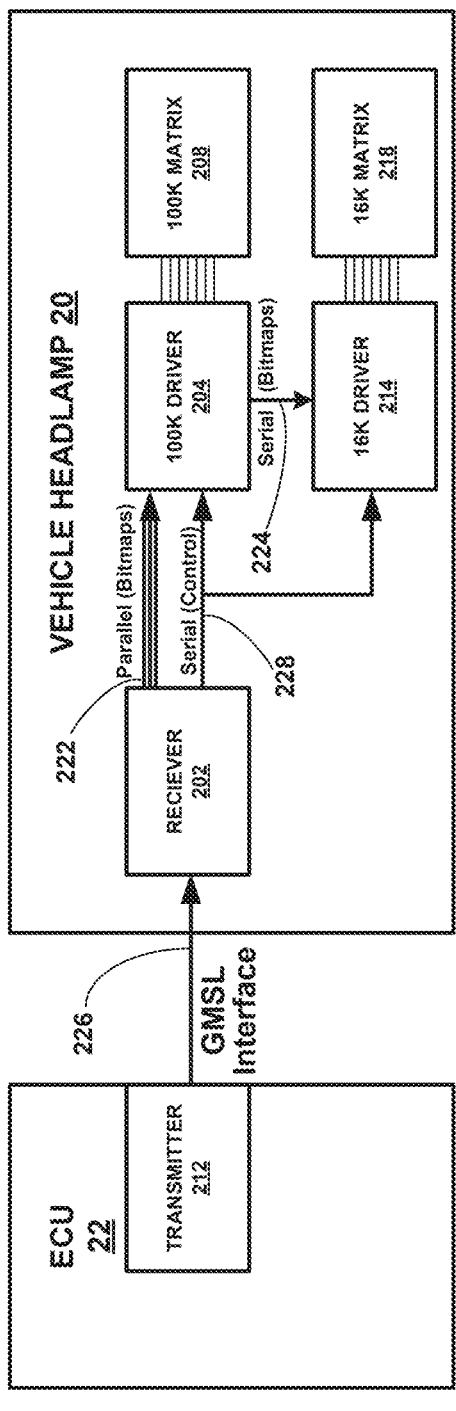
FIG. 2 is block diagram illustrating a system that includes a vehicle headlamp and an electronic control unit (ECU) consistent with this disclosure.

FIG. 2 is block diagram illustrating a system that includes a vehicle headlamp 20 and an electronic control unit (ECU 22) consistent with this disclosure. FIG. 2 is consistent with FIG. 1 in that vehicle headlamp 20 is one example of a lighting circuit 10 and ECU 22 is one example of a processor 12. The example shown in FIG. 2 is specific for vehicular headlamp lighting.

A complex system for vehicle headlamp 20 may be configured to support more than one pixelated light sources by a local microcontroller, such as ECU 22. To support multiple matrix LEDs, ECU 22 could utilize several output interfaces or several local De-serializer, which can result in too many links from ECU 22 to vehicle headlamp 20 (e.g. GMSL, FPD-Link, or another). Some new high-definition lighting systems for vehicles may include a 100 k matrix (e.g., approximately 100,000 pixels) and a 16 k matrix (e.g., approximately 16,000 pixels). Two different GMSL links could be used to support this type of high-definition lighting system, but two high-definition lighting systems using two different GMSL links adds undesirable cost and can create complexities for synchronization and for frame updates in both the 100 k and 16 k matrices.

In some examples, the circuits of this disclosure can address these issues and complexities by including a "bridge" function inside the 100 k matrix driver 204. In the example shown in FIG. 2, ECU 22 includes a transmitter circuit 212 and vehicle headlamp 20 includes a receiver circuit 202. Transmitter circuit 212 sends information to receiver circuit 202 via GMSL interface 226, or possibly another type of high-speed input interface.

Receiver circuit configured to receive the information comprising a first bitmap associated with a first set of lighting elements (e.g., 100K matrix 208) and a second bitmap associated with a second set of lighting elements (e.g., 16K matrix 218). 100K driver circuit 204 is connected to receiver circuit 202 via a first communication interface (e.g., parallel interfaced 222). Thus, 100K driver circuit 204 is configured to receive the information from receiver circuit 202 via the parallel interface 222. 100K driver circuit 204 and 16K driver circuit 214 may comprise application specific integrated circuits (ASICs) that are directly connected, respectively, to 100K matrix 208 and 16K matrix. Each pixel of 100K matrix 208 may be connected directly to 100K driver 204, and each pixel of 16K matrix 218 may be connected directly to 16K driver.

100K driver circuit 204 may be configured to extract the first bitmap and the second bitmap from the information, store the first bitmap for driving the first set of lighting elements (i.e., 100K matrix 208), and output the second bitmap via a second communication interface 224 (e.g., a serial interface) to 16K driver circuit 214 for driving the second set of lighting elements (i.e., 16K matrix 218).

100 k driver circuit 204 may be configured to extract from an incoming large video frame that includes both 100 k and 16 k information, only the information related to the 16 k matrix and send over a serial VUART output. In this case, the 100 k driver 204 may be capable of updating update the two frame in a "quasi" synch way by knowing the end of transmission and having an XTAL to define the internal PWM in a synchronous manner with the 16 k driver 204. This system provides advantages of cost reduction and simplifying and improving frame update synchronization for both the 100 k matrix 208 and the 16K matrix 218. By including the information for driving both the 100 k matrix 208 and the 16K matrix 218 in a common video data frame, synchronized control can be improved and simplified.

Figure 3:
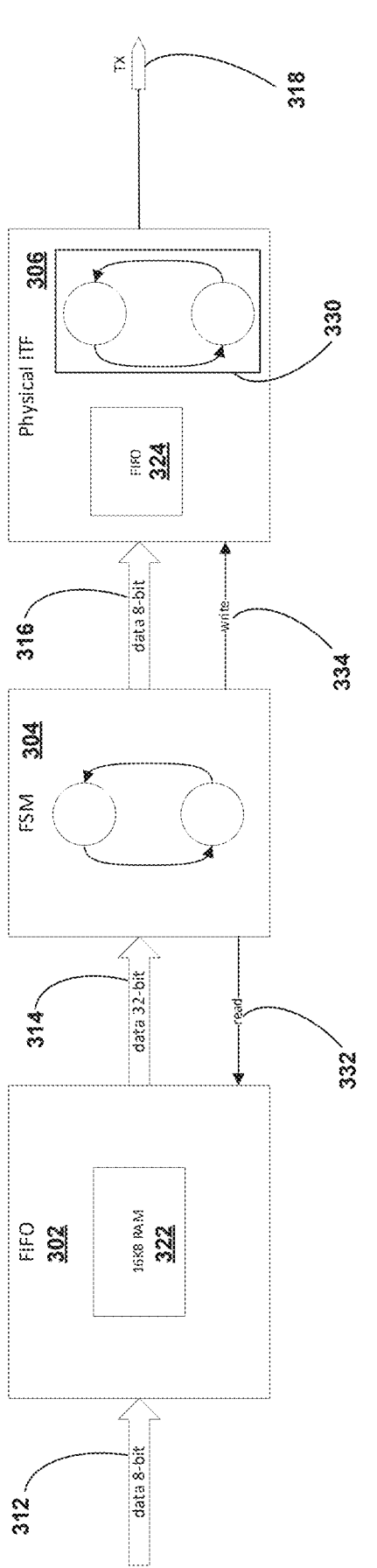
FIG. 3 is block diagram illustrating one example of logic that may be used in a driver circuit to facilitate bitmap data extraction and bitmap data distribution consistent with this disclosure.

FIG. 3 is block diagram illustrating one example of logic that may be used in a driver circuit to facilitate the bridge functions of bitmap data extraction and bitmap data distribution consistent with this disclosure. The logic shown in FIG. 3, for examples, may be included in first driver circuit 104 of FIG. 1 or in 100K driver circuit 204 of FIG. 2 to perform techniques of this disclosure.

As shown, a first-in-first-out (FIFO) buffer 302 may include random access memory (322) configured to buffer a 16K frame based on 8-bit inputs 312 that arrive over a parallel interface. Finite state machine (FSM) 304 performs read operations 332 to extract data in 32-bit increments 314. FSM 304 then performs a write operation 334 to extract 8-bit outputs 316, which are stored in second FIFO buffer 324 of a physical interface 306, which includes an output pin 318 connected to another driver circuit. In this way, the logic shown in FIG. 3 can perform the data extraction, translation to a different interface format, and output to another driver.

In some examples, FIFO buffer 302 comprises 16 k of RAM 322 protected by 32+7 error correction code (ECC) so that FIFO buffer 302 is capable of buffering an entire 16 k frame. 8-bit data can be buffered before being written (8-bit to 32-bit data). A RAM read/write arbiter (not shown) may be configured to write from an RGB interface (highest priority), and read from an internal protocol FSM (e.g., FSM 304).

FSM 304 can be configured to pack the data into rows (256 bytes for each row) and generate the row index (a total of 64 rows). In some examples, a 16-bit CRC can be calculated for each row and appended at the end. Physical interface 306 include an asynchronous FIFO buffer that buffers the incoming 8-bit data. An FSM 330 associated with physical interface 306 turns the 8-bit data frame from protocol FSM into a serial output. A start and stop bit can be inserted for each 8-bit data frame. Interframe delay (bus idle) information can be generated at the end of each row.

In some examples, 8-bit inputs 312 may be sent using UART functionality. An RGB interface sends the 8-bit data inputs 312 directly to the VUART master. Data can be stored inside a RAM 322 (e.g., 16 k buffer, the whole frame) in a 32-bit format. Whenever data is available inside the RAM, the VUART FSM 304 reads, unpacks the data and calculates the CRC, and then then sends everything to the physical interface 306 which generates the serial data out (VTX). An RGB interface sends a CRC available/ok at the end of the 100 k frame, and the VUART FSM 316 may wait for this information before sending the last 16 k row (i.e., index 63). If the incoming 100 k CRC check is not successful, the 16 k CRC of the last row may be considered to be corrupted. If the data read from the RAM returns a double bit ECC error, the CRC can be considered to be corrupted. The driver circuit can invalidate the 16 k frame at any time. In this case, the VUART master that controls FSM 304 can send an interframe delay and then skip to the last row (63), basically resetting the 16 k slave.

The described circuits and techniques can help support the trend for centralized car computing by simplification of the communication inside vehicle headlamp when more than one pixelated light source might be used. To do so, a smart function can be integrated into a main light source driver (i.e., a master) to decapsulate the video data from a single frame and distribute to a one or several other light source drivers (i.e., slaves).

Figure 4:
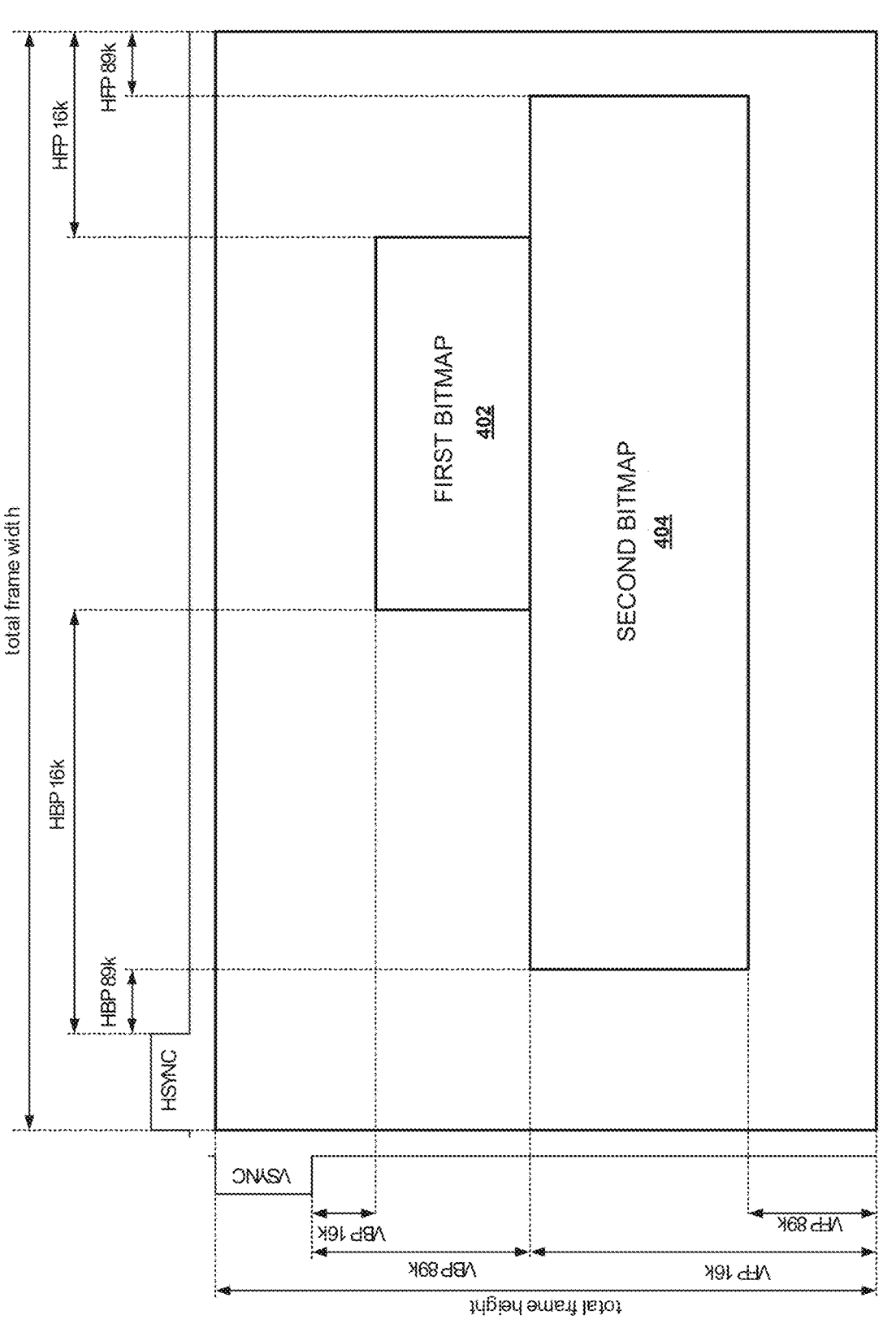
FIG. 4 is a graph illustrating one possible technique of encoding two bitmaps in one data frame.
Figure 5:
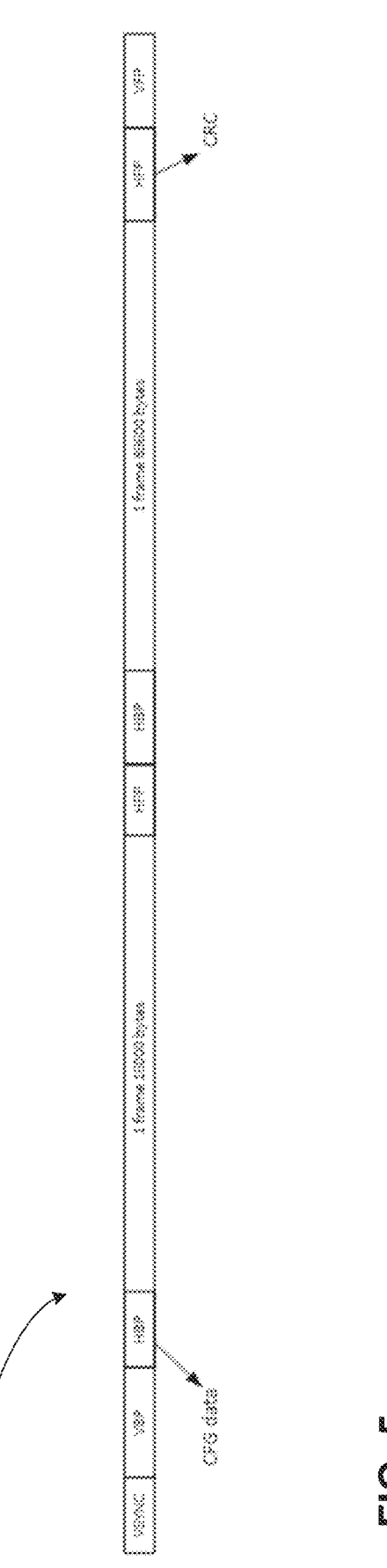
FIG. 5 is a conceptual diagram of a data structure showing encoding of two bitmaps in one data frame consistent with FIG. 4.

FIG. 4 is a graph illustrating one possible technique of encoding two bitmaps in one data frame consistent with so-called red-green-blue (RGB) video coding. First driver circuit 104 of FIG. 1 (or 100K driver circuit 204 of FIG. 2) may be configured to extract a first bitmap 404 and a second bitmap 402 from the information coded as shown in FIG. 4 based on horizontal porch elements and vertical porch elements, wherein the horizontal porch elements and vertical porch elements define sizes of the first bitmap and the second bitmap within the frame. The horizontal porch elements correspond to the information labeled HBP (horizontal back porch) and HFP (horizontal front porch). The vertical porch elements correspond to the information labeled VBP (vertical back porch) and VFP (vertical front porch). As can be appreciated from FIG. 4, the horizontal porch elements and vertical porch elements define sizes of the first bitmap and the second bitmap within the frame, and these data structures can inform driver circuit 104 of FIG. 1 (or 100K driver circuit 204 of FIG. 2) how to extract a first bitmap 404 and a second bitmap 402 from the information. A 32-bit CRC may always be sent during the horizontal front porch period of the last transmitted row. In this case the 32-Bit CRC may be calculated over the data, including both the first bitmap 404 and the second bitmap 402. Thus, if the 32-Bit CRC is wrong, the entire frame of information may be discarded. FIG. 5 is a conceptual diagram of a data structure 502 showing encoding of two bitmaps in one data frame consistent with FIG. 4 and the description above.

Figure 6:
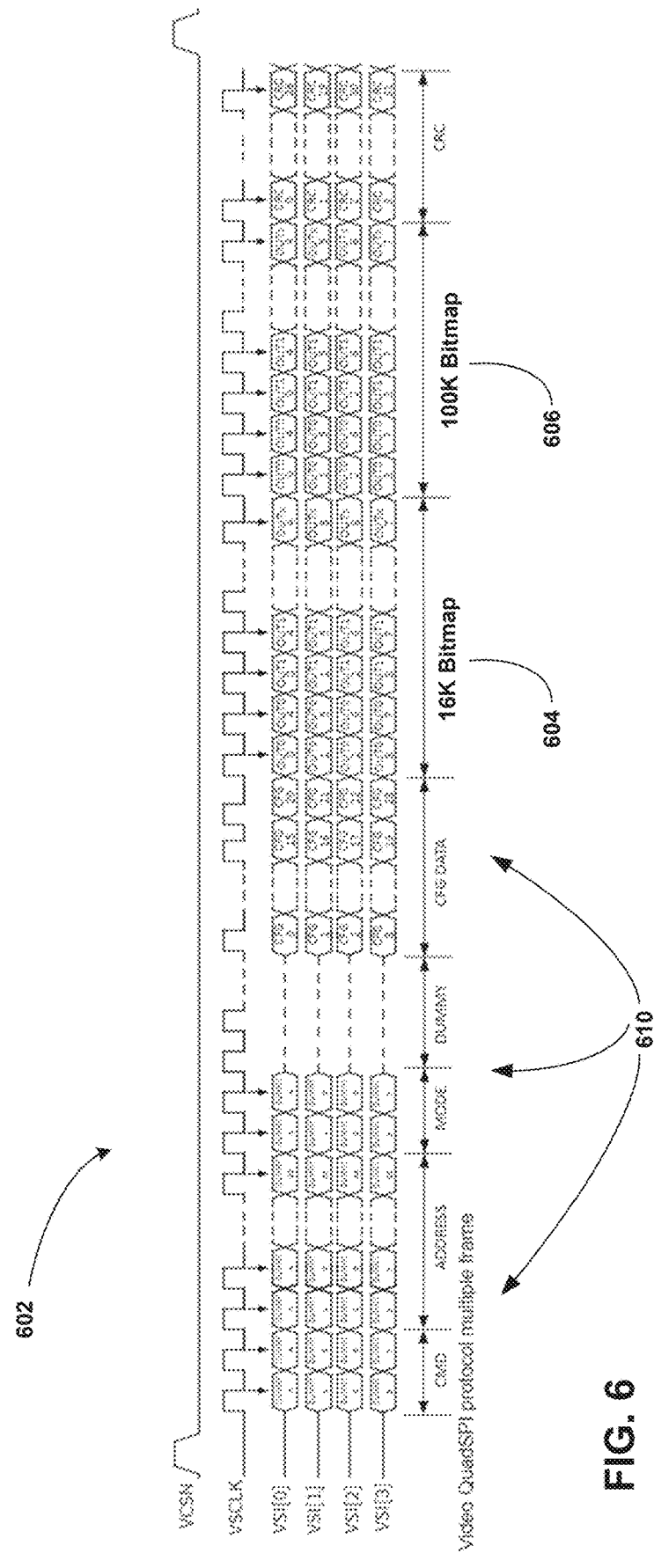
FIG. 6 is a conceptual diagram of another data structure showing encoding of two bitmaps in one data frame.

FIG. 6 is a conceptual diagram of another data structure showing encoding of two bitmaps in one data frame 602. In this type of example, the data structure may be known by driver circuit that does the decoding and translating. With this type of example, first driver circuit 104 of FIG. 1 or 100K driver circuit 204 of FIG. 2 may be configured to extract the first bitmap and the second bitmap from the received information based on known and pre-defined amounts of data associated with the first bitmap and the second bitmap within the frame.

For example, first driver circuit 104 of FIG. 1 or 100K driver circuit 204 can be configured to know the locations of 16K bitmap 604 (i.e., an example of a first bitmap) and 100K bitmap 606 (i.e., an example of a second bitmap) within data structure 602, e.g., relative to an input signal (VCSN) or relative to clock signals VSCLK. FIG. 6 illustrates a six pin example with different pins for signals VCSN, VSCLK, and VS1[0], VS1[1], VS1[2], and VS1[3]. VS1[0], VS1[1], VS1[2], and VS1[3] may comprise four data channels that include 16K bitmap 604 and 100K bitmap 606 at pre-defined locations within data structure. First driver circuit 104 of FIG. 1 or 100K driver circuit 204 may decode overhead information 610 at pre-defined locations of data structure 602, and can extract 16K bitmap 604 and 100K bitmap 606 from known locations with data structure 602. Translation or bridging functions, e.g., on the 16K bitmap 604, may then be performed on the data to improve the communication of 16K bitmap 604 to another circuit.

In some examples, frame updates may be handled by first driver circuit 104 of FIG. 1 or by 100K driver circuit 204. Driver circuit 104, 204 may receive an entire frame that includes a 16 k bitmap and a 100 k bitmap. Driver circuit 104, 204 may extract the 16K bitmap by using configurable back and front porch elements. Driver circuit 104, 204 may start to send the data over V-UART to a different driver circuit, e.g., the 100K driver circuit 204 may send the 16K bitmap to the 16K driver circuit 214. Driver circuit 104, 204 attaches the CRC at the end of each row and parity bit as required by the 16 k ASIC. Driver circuit 104, 204, while sending the 16K bitmap to another circuit also stores the 100K bitmap in an internal buffer.

Two scenarios are now described. In a first scenario, the 100 k bitmap may be stored inside a local memory associated with driver circuit 104, 204 before sending out the 16K bitmap. In this case, the driver circuit 104, 204 may be configured to update its 100K bitmap only when the full 16K bitmap is sent out to the 16K driver circuit, and only if CRC bit is valid. In a second scenario, the 16K bitmap may be sent before the full 100K bitmap data has been stored locally by driver circuit 104, 204. In this case, driver circuit 104, 204 may wait to send the last row of the 16K bitmap until after the full 100K bitmap is extracted and stored in driver circuit 104, 204 and the CRC bit has been validated. This second scenario may improve the speed of data communication to the 16K driver circuit relative to the first scenario. A system integrator may need to ensure that the clock frequencies (RGB, VUART) are chosen in a way that a watch-dog timer of the 16K driver does not expire.

In these or other cases, both 100K and 16K updates in a new data frame may only be applied when the previously running PWM cycle is finished. In some examples, the system may utilize an external system clock reference, such as quartz or a precise clock source from an external source to define the PWM period for both the 16K driver circuit and the 100K driver circuit. In this way, a frame update can be better synchronized by both driver circuits. Otherwise, the frames can be updated in a worst case, which may result in one PWM period of difference between updates applied by the 16K driver circuit and the 100K driver circuit.

Some possible error correction (e.g., CRC behavior) will now be described. In case of problems when sending the data from the 100K driver to the 16K driver for any reason, the 16K driver may be configured to discard the received 16K bitmap and keep the previous 16K bitmap. In this case the 100K driver may lack visibility to the problem, and it may be the function of processor 12 or ECU 22 to monitor the status and react accordingly. This is also the case if the 16K driver goes into a safe state or a state that limits the ability to receive frame updates. Again, it may be the task of processor 12 or ECU 22 to monitor the status and react accordingly. Nevertheless, this error correction behavior and monitoring by processor 12 or ECU 22 may not be strictly correlated to the bridge functions and may be a situation to consider for any data communication between drivers.

FIG. 7 is a flow diagram consistent with techniques according to this disclosure. A method consistent with FIG. 7 may be performed by first driver circuit 104 of FIG. 1 or by 100K driver circuit 204, e.g., within a lighting module. Driver circuit 104, 204 may receive from a receiver circuit 102, 202, information from a processor 12, 22 that comprises two or more bitmaps encoded in an encoded frame (701). More specifically, driver circuit 104, 204 may receive from a receiver circuit 102, 202, information from a processor 12, 22, wherein the information comprises a first bitmap associated with a first set of lighting elements 108, 208 within a first lighting module and a second bitmap associated with a second set of lighting elements 118, 218 within a second lighting module. Driver circuit 104, 204 receives the information via a first communication interface 122, 222 with receiver circuit 102, 202 (702). Driver circuit 104, 204 extracts the first bitmap and the second bitmap from the information (703). Driver circuit 104, 204 stores the first bitmap (e.g., in a memory such as memory 106 shown in FIG. 1) for driving the first set of lighting elements 108, 208 (704). Driver circuit 104, 204 also outputs the second bitmap over a second communication interface 124, 224 to a second lighting module (e.g., to second driver circuit 114 or 16K driver circuit 214) for driving the second set of lighting elements 118, 218 (705).

In some examples, a lighting module may include a driver circuit 104, 204 configured to receive information comprising a first bitmap and a second bitmap via a first interface, store the first bitmap, buffer the second bitmap, extract rows associated with the second bitmap, and output the rows associated with the second bitmap via a second interface.

In some examples, the information comprises a frame and the method includes: receiving, by driver circuit 104, 204, the frame comprising the first bitmap and the second bitmap via the first communication interface 122, 222, storing the first bitmap in driver circuit 104, 204, buffering the second bitmap in driver circuit 104, 204, extracting rows from the frame associated with the second bitmap, and outputting from driver circuit 104, 204 the rows associated with the second bitmap via the second communication interface 124, 224.

The techniques described in this disclosure may be implemented in circuitry. In various examples, the techniques may be implemented, at least in part, in circuitry, hardware, software, firmware or any combination thereof. For example, various aspects of the described techniques may be implemented within one or more logical elements, processors, including one or more microcontrollers, microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such circuitry, hardware, software, and firmware may be implemented within the same device or integrated circuit or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, e.g., especially for logic or decisions, in which case those aspects of the techniques described in this disclosure may also be embodied or encoded in a computer-readable medium, such as a computer-readable storage medium, containing instructions. Instructions embedded or encoded in a computer-readable storage medium may cause a processor, to perform the method, e.g., when the instructions are executed. The instructions, in this example, may be stored in a memory, which may comprise random access memory (RAM), read only memory (ROM), programmable read only memory (PROM), erasable programmable read only memory (EPROM), electronically erasable programmable read only memory (EEPROM), flash memory, or other computer readable media.

The following clauses may illustrate one or more aspects of the disclosure.

Clause 1: A lighting circuit comprising: a receiver circuit configured to receive information from a processor, wherein the information comprises a first bitmap associated with a first set of lighting elements and a second bitmap associated with a second set of lighting elements; and a driver circuit connected to the receiver circuit via a first communication interface, wherein the driver circuit is configured to receive the information from the receiver circuit via the first communication interface, wherein the driver circuit is configured to extract the first bitmap and the second bitmap from the information, store the first bitmap for driving the first set of lighting elements, and output the second bitmap via a second communication interface to another circuit for driving the second set of lighting elements.

Clause 2: The lighting circuit of clause 1, wherein the first communication interface comprises a parallel interface that includes a plurality of connectors arranged in parallel and wherein the second communication interface comprises a serial interface that includes a single connector, and wherein the receiver circuit is configured to receive the information from the processor via an input interface.

Clause 3: The lighting circuit of clause 1 or 2, wherein the first bitmap includes greater than 20,000 intensity values and the first set of lighting elements comprise greater than 20,000 light emitting diodes, and wherein the second bitmap includes fewer than 20,000 intensity values and the second set of lighting elements comprise fewer than 20,000 light emitting diodes.

Clause 4: The lighting circuit of any of clauses 1-3, wherein the driver circuit is configured to drive the first set of lighting elements within a vehicle headlamp module, wherein the information comprises a frame of headlamp information, wherein the frame of headlamp information includes the first bitmap and the second bitmap.

Clause 5: The lighting circuit of clause 4, wherein the driver circuit is configured to extract the first bitmap and the second bitmap from the headlamp information based on horizontal porch elements and vertical porch elements, wherein the horizontal porch elements and vertical porch elements define sizes of the first bitmap and the second bitmap within the frame.

Clause 6: The lighting circuit of clause 4, wherein the driver circuit is configured to extract the first bitmap and the second bitmap from the frame of headlamp information based on known and pre-defined amounts of data associated with the first bitmap and the second bitmap within the frame.

Clause 7: The lighting circuit of any of clauses 4-6, wherein the driver circuit is configured to synchronize updates of the first bitmap and the second bitmap based on a subsequent frame of the headlamp information.

Clause 8: The lighting circuit of any of clauses 1-7, wherein the driver circuit is configured to output the second bitmap after extracting the first bitmap and the second bitmap and in response to a valid cyclical redundancy check (CRC).

Clause 9: The lighting circuit of any of clauses 1-8, wherein the driver circuit is configured to begin output the second bitmap while extracting the first and second bitmaps.

Clause 9: The lighting circuit of any of clauses 1-9, wherein the driver circuit is configured to drive the first set of lighting elements based on the first bitmap in response to determining an end of prior pulse modulation (PM) cycles of the first set of lighting elements.

Clause 11: The lighting circuit of any of clauses 1-10, wherein the driver circuit is configured to drive the first set of lighting elements based on the first bitmap at a time when the another circuit drives the second set of lighting elements based on the second bitmap.

Clause 12: The lighting circuit of any of clauses 1-11, wherein the information comprises a frame and the driver circuit is configured to: receive the frame comprising the first bitmap and the second bitmap via the first communication interface; store the first bitmap; buffer the second bitmap; extract rows from the frame associated with the second bitmap; and output the rows associated with the second bitmap via the second communication interface.

Clause 13: A lighting system comprising: a first lighting module comprising: a receiver circuit configured to receive information from a processor, wherein the information comprises a first bitmap associated with a first set of lighting elements and a second bitmap associated with a second set of lighting elements; and a first driver circuit connected to the receiver circuit via a first communication interface, wherein the first driver circuit is configured to receive the information from the receiver circuit via the first communication interface; and a second lighting module comprising a second driver circuit and a second set of lighting elements, wherein the first driver circuit is configured to extract the first bitmap and the second bitmap from the information, store the first bitmap for driving the first set of lighting elements, and output the second bitmap via a second communication interface to the second lighting module.

Clause 14: The lighting system of clause 13, wherein the first bitmap includes greater than 20,000 intensity values and the first set of lighting elements comprise greater than 20,000 light emitting diodes, and wherein the second bitmap includes fewer than 20,000 intensity values and the second set of lighting elements comprise fewer than 20,000 light emitting diodes.

Clause 15: The lighting system of clause 13 or 14, wherein the first lighting module comprises a first vehicle headlamp module and the first driver circuit is configured to drive the first set of lighting elements within the first vehicle headlamp module, wherein the information comprises a frame of headlamp information, wherein the frame of headlamp information includes the first bitmap and the second bitmap.

Clause 16: The lighting system of clause 15, wherein the first driver circuit is configured to extract the first bitmap and the second bitmap from the headlamp information based on horizontal porch elements and vertical porch elements, wherein the horizontal porch elements and vertical porch elements define sizes of the first bitmap and the second bitmap within the frame.

Clause 17: The lighting system of clause 15, wherein the first driver circuit is configured to extract the first bitmap and the second bitmap from the frame of headlamp information based on known and pre-defined amounts of data associated with the first bitmap and the second bitmap within the frame.

Clause 18: The lighting system of any of clauses 15-17, wherein the first driver circuit is configured to synchronize updates of the first bitmap and the second bitmap based on a subsequent frame of the headlamp information.

Clause 19: The lighting system of any of clauses 13-18 wherein the first driver circuit is configured to output the second bitmap to the second lighting module after the first driver extracts the first bitmap and the second bitmap and in response to a valid cyclical redundancy check (CRC).

Clause 20: The lighting system any of clauses 13-19, wherein the first driver circuit of the first lighting module is configured to begin output of the second bitmap to the second lighting module while extracting the first and second bitmaps.

Clause 21: The lighting system of any of clauses 13-20, wherein the first driver circuit is configured to drive the first set of lighting elements based on the first bitmap in response to determining an end of prior pulse modulation (PM) cycles of the first set of lighting elements.

Clause 22: The lighting system of any of clauses 13-21, wherein the first driver circuit is configured to drive the first set of lighting elements based on the first bitmap at a time when the second driver circuit is configured to drive the second set of lighting elements based on the second bitmap.

Clause 23: A method comprising: receiving by a receiver circuit of a first lighting module, information from a processor, wherein the information comprises a first bitmap associated with a first set of lighting elements within the first lighting module and a second bitmap associated with a second set of lighting elements within a second lighting module; receiving by a driver circuit of the first lighting module, the information from the receiver circuit via a first communication interface; extracting the first bitmap and the second bitmap from the information; storing the first bitmap within the first lighting module for driving the first set of lighting elements; and outputting the second bitmap from the first lighting module to the second lighting module via a second communication interface for driving the second set of lighting elements.

Clause 24: The method of clause 23, wherein the information comprises a frame and the method includes: receiving, by the driver circuit, the frame comprising the first bitmap and the second bitmap via the first communication interface; storing the first bitmap in the driver circuit; buffering the second bitmap in the driver circuit; extracting rows from the frame associated with the second bitmap; and outputting from the driver circuit the rows associated with the second bitmap via the second communication interface.

Clause 25: The method of clause 23, wherein the first lighting module includes the lighting circuit of any of claims 1-12.

Various aspects have been described in this disclosure. These and other aspects are within the scope of the following claims.

The invention claimed is:

1. A lighting circuit comprising:
   a receiver circuit configured to receive information from a processor, wherein the information comprises a first bitmap associated with a first set of lighting elements and a second bitmap associated with a second set of lighting elements; and
   a driver circuit connected to the receiver circuit via a first communication interface, wherein the driver circuit is configured to receive the information from the receiver circuit via the first communication interface,
   wherein the driver circuit is configured to extract the first bitmap and the second bitmap from the information, store the first bitmap for driving the first set of lighting elements, and output the second bitmap via a second communication interface to another circuit for driving the second set of lighting elements.

2. The lighting circuit of claim 1, wherein the first communication interface comprises a parallel interface that includes a plurality of connectors arranged in parallel and wherein the second communication interface comprises a serial interface that includes a single connector, and wherein the receiver circuit is configured to receive the information from the processor via an input interface.

3. The lighting circuit of claim 1, wherein the first bitmap includes greater than 20,000 intensity values and the first set of lighting elements comprise greater than 20,000 light emitting diodes, and wherein the second bitmap includes fewer than 20,000 intensity values and the second set of lighting elements comprise fewer than 20,000 light emitting diodes.

4. The lighting circuit of claim 1, wherein the driver circuit is configured to drive the first set of lighting elements within a vehicle headlamp module, wherein the information comprises a frame of headlamp information, wherein the frame of headlamp information includes the first bitmap and the second bitmap.

5. The lighting circuit of claim 4, wherein the driver circuit is configured to extract the first bitmap and the second bitmap from the headlamp information based on horizontal porch elements and vertical porch elements, wherein the horizontal porch elements and vertical porch elements define sizes of the first bitmap and the second bitmap within the frame.

6. The lighting circuit of claim 4, wherein the driver circuit is configured to extract the first bitmap and the second bitmap from the frame of headlamp information based on known and pre-defined amounts of data associated with the first bitmap and the second bitmap within the frame.

7. The lighting circuit of claim 4, wherein the driver circuit is configured to synchronize updates of the first bitmap and the second bitmap based on a subsequent frame of the headlamp information.

8. The lighting circuit of claim 1, wherein the driver circuit is configured to output the second bitmap after extracting the first bitmap and the second bitmap and in response to a valid cyclical redundancy check (CRC).

9. The lighting circuit of claim 1, wherein the driver circuit is configured to begin output the second bitmap while extracting the first and second bitmaps.

10. The lighting circuit of claim 1, wherein the driver circuit is configured to drive the first set of lighting elements based on the first bitmap in response to determining an end of prior pulse modulation (PM) cycles of the first set of lighting elements.

11. The lighting circuit of claim 1, wherein the driver circuit is configured to drive the first set of lighting elements based on the first bitmap at a time when the another circuit drives the second set of lighting elements based on the second bitmap.

12. The lighting circuit of claim 1, wherein the information comprises a frame and the driver circuit is configured to:
   receive the frame comprising the first bitmap and the second bitmap via the first communication interface;
   store the first bitmap;
   buffer the second bitmap;
   extract rows from the frame associated with the second bitmap; and
   output the rows associated with the second bitmap via the second communication interface.

13. A lighting system comprising:
   a first lighting module comprising:
   a receiver circuit configured to receive information from a processor, wherein the information comprises a first bitmap associated with a first set of lighting elements and a second bitmap associated with a second set of lighting elements; and a first driver circuit connected to the receiver circuit via a first communication interface, wherein the first driver circuit is configured to receive the information from the receiver circuit via the first communication interface; and a second lighting module comprising a second driver circuit and a second set of lighting elements, wherein the first driver circuit is configured to extract the first bitmap and the second bitmap from the information, store the first bitmap for driving the first set of lighting elements, and output the second bitmap via a second communication interface to the second lighting module.

14. The lighting system of claim 13, wherein the first bitmap includes greater than 20,000 intensity values and the first set of lighting elements comprise greater than 20,000 light emitting diodes, and wherein the second bitmap includes fewer than 20,000 intensity values and the second set of lighting elements comprise fewer than 20,000 light emitting diodes.

15. The lighting system of claim 13, wherein the first lighting module comprises a first vehicle headlamp module and the first driver circuit is configured to drive the first set of lighting elements within the first vehicle headlamp module, wherein the information comprises a frame of headlamp information, wherein the frame of headlamp information includes the first bitmap and the second bitmap.

16. The lighting system of claim 15, wherein the first driver circuit is configured to extract the first bitmap and the second bitmap from the headlamp information based on horizontal porch elements and vertical porch elements, wherein the horizontal porch elements and vertical porch elements define sizes of the first bitmap and the second bitmap within the frame.

17. The lighting system of claim 15, wherein the first driver circuit is configured to extract the first bitmap and the second bitmap from the frame of headlamp information based on known and pre-defined amounts of data associated with the first bitmap and the second bitmap within the frame.

18. The lighting system of claim 15, wherein the first driver circuit is configured to synchronize updates of the first bitmap and the second bitmap based on a subsequent frame of the headlamp information.

19. The lighting system of claim 13 wherein the first driver circuit is configured to output the second bitmap to the second lighting module after the first driver extracts the first bitmap and the second bitmap and in response to a valid cyclical redundancy check (CRC).

20. The lighting system claim 13, wherein the first driver circuit of the first lighting module is configured to begin output of the second bitmap to the second lighting module while extracting the first and second bitmaps.

21. The lighting system of claim 13, wherein the first driver circuit is configured to drive the first set of lighting elements based on the first bitmap in response to determining an end of prior pulse modulation (PM) cycles of the first set of lighting elements.

22. The lighting system of claim 13, wherein the first driver circuit is configured to drive the first set of lighting elements based on the first bitmap at a time when the second driver circuit is configured to drive the second set of lighting elements based on the second bitmap.

23. A method comprising:

receiving by a receiver circuit of a first lighting module, information from a processor, wherein the information comprises a first bitmap associated with a first set of lighting elements within the first lighting module and a second bitmap associated with a second set of lighting elements within a second lighting module;

receiving by a driver circuit of the first lighting module, the information from the receiver circuit via a first communication interface;

extracting the first bitmap and the second bitmap from the information;

storing the first bitmap within the first lighting module for driving the first set of lighting elements; and outputting the second bitmap from the first lighting module to the second lighting module via a second communication interface for driving the second set of lighting elements.

24. The method of claim 23, wherein the information comprises a frame and the method includes:

receiving, by the driver circuit, the frame comprising the first bitmap and the second bitmap via the first communication interface;

storing the first bitmap in the driver circuit;

buffering the second bitmap in the driver circuit;

extracting rows from the frame associated with the second bitmap; and outputting from the driver circuit the rows associated with the second bitmap via the second communication interface.

* * * * *